July 30, 1963   O. FREUDENSCHUSS   3,099,193
FILM CAMERA HAVING COMBINED SHUTTER AND PHOTO ELECTRIC CELL
Filed Nov. 8, 1960
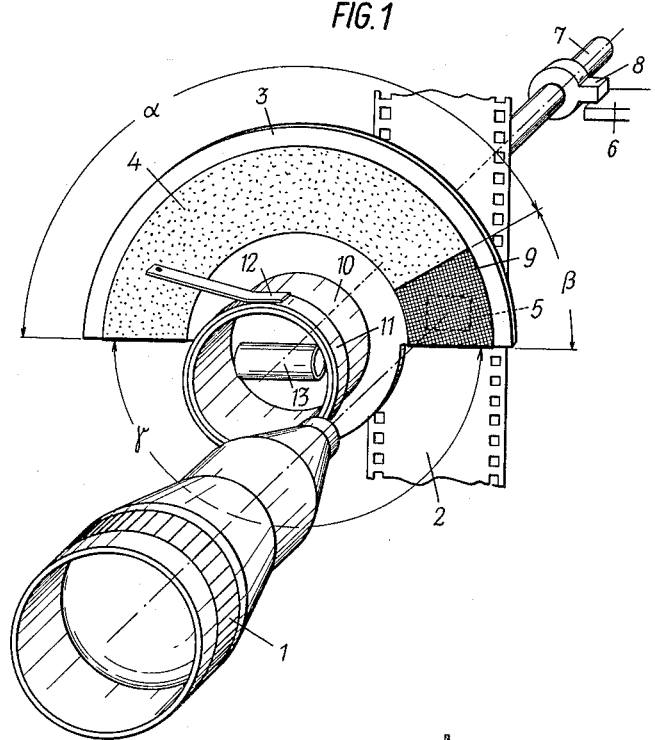
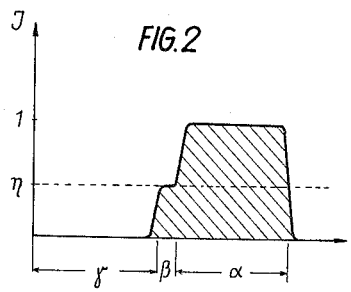
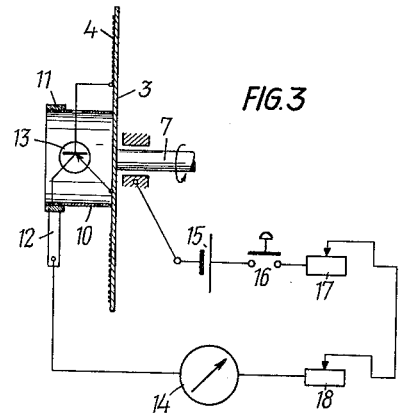
Inventor:
Otto Freudenschuss
By Ernest G. Montague
Attorney

# United States Patent Office 3,099,193
Patented July 30, 1963

3,099,193
FILM CAMERA HAVING COMBINED SHUTTER AND PHOTO ELECTRIC CELL
Otto Freudenschuss, Vienna, Austria, assignor to Karl Vochenhuber, Vienna, Austria
Filed Nov. 8, 1960, Ser. No. 68,105
Claims priority, application Austria Nov. 10, 1959
5 Claims. (Cl. 95—10)

The present invention relates to a film camera including an exposure metering device, wherein the periodically moved rotating shutter is covered with a photo-sensitive layer.

In a known exposure control for cameras, means for indicating when the diaphragm of the camera is at the proper opening have been proposed, wherein the indicating means comprises a light sensitive cell, the response of which is proportional to the intensity of the light transmitted by the diaphragm, as well as a view finder and finally means controlled by the response of the cell for introducing a distinctive color change in the light path through the view finder, whenever the diaphragm is set at other than the proper opening.

Due to the fact that the light sensitive cell is operative only during the period of movement of the film and inoperative during the exposure of the latter, a galvanometer, operated by the light sensitive cell, indicates a reduced median value of the current produced during use of the camera and the full value of the current produced during non-use of the camera. Different measures have been proposed to avoid this discrepancy in the current value during use and non-use, respectively, of the camera.

In particular, the known exposure control has a shutter blade, the face of which is disposed opposite the objective and carries a photo-sensitive compound layer. The photo-sensitive compound is in electric connection with a coil of an indicating meter by means of brushes, a pointer of an indicating meter moving a transparent vane positioned in the light beam passing through the view finder.

If the camera is in operation, the film is moved stepwise through a gate which supports the film in the focal plane of the objective. The rotating shutter blade covers, during the movement of the film, the gate and exposes the gate and thereby the film during a period of standstill of the film. It is, thus, quite apparent that the photo-sensitive compound receives a light impact only during the moving phase of the film. Due to this arrangement, a pulsating current flows through the coil of the indicating meter, which reaches its maximum value during the moving-phase of the film and returns to zero during the rotating period of the shutter, during which the exposure of the film takes place.

The indicating meter cannot follow the fast current change, since there are at least 16 per second, and shows on the indicating meter the median value of the current obtained during a complete revolution of the shutter blade.

The shutter blade extends over an angle of about 240°, so that during the movement of the shutter blade over the angle of 240°, the maximum value of current flows through the coil 1 of the indicating meter, while over an angular period of about 120° of the movement of the shutter blade, the coil does not carry any current. The indicating meter thus shows a value, which amounts to about ⅔ of the maximum value.

If the camera is not in use, generally the shutter blade is stopped at such position, that the film is covered at an exposure of the film appearing in the gate. The shutter blade and, thereby, the photo-sensitive compound is completely subjected to the light path extending through the objective. The current produced has the same value which is obtained during the use of the camera, however, only during the moving phase of the film, yet is not interrupted now, due to the standstill of the shutter, and rather constant, so that the indicating meter shows the currents emanated from the photo-cell, the errors caused by the switch can assume appreciable values. Due to the arrangement of a switch and of a resistance, additional constructive elements are required.

It is for this reason one aim of the present invention to avoid the drawbacks of the described known arrangement, and particularly concerning the reliability of the results and in relation to the number of structural elements required for proper operation concerning the equalization of the current indication regardless whether the shutter is at a standstill or whether it is in rotation.

It has been now found, that this problem can be solved in a surprisingly simple manner, by an arrangement according to which the effect or the output of the photo-electric cell is reduced at the point which is disposed opposite the objective during the standstill of the shutter to a value, which is equal to the median value of the current emanating from the photo-cell over a full period of the shutter movement. Due to this novel arrangement the additional structural elements, as switches, resistances, etc., are eliminated, since in both instances, namely during operation of the shutter blade, as well as during standstill of the shutter blade, the values of the currents indicated on the indicating meter are equal.

It is, therefore, one object of the present invention to provide a film camera which affords an essentially simpler solution of the present problem, starting with the presumption that on arresting the camera the shutter is secured in a predetermined, exactly defined position.

It is another object of the present invention to provide a film camera wherein the photo-electric layer provides an efficiency within the range of the picture which is projected by the objective on the layer while the camera stands still, the efficiency being equal to an average value for a full period of the shutter movement, the efficiency being the proportion of delivered electric energy in relation to the light energy incident through the objective.

It is still another object of the present invention to provide a film camera wherein the photo-electric cell is arranged, within the range of the picture which is projected by the objective on the layer, while the camera stands still, with a homogeneous gray filter layer, for example with a gray filter foil.

The reduction of the efficiency of the photo-electric layer can be obtained easier and also more exactly in such manner that the layer is covered by a semi-transparent coating or by a raster with a practically light-tight layer, preferably by printing, within the range of the picture which is projected by the objective on the layer while the camera stands still.

It is yet another object of the present invention to provide a film camera, wherein the photo-electric layer is split up into individual sectors insulated relative to each other, the sector on which a picture is projected by the objective, while the camera stands still, being connected with the electrodes of the other sectors by means of a resistor.

It is also a further object of the present invention to provide a film camera wherein the photo-electric layer covers the shutter within the range of the picture which is projected by the objective, while the camera stands still, corresponding with the desired efficiency proportion, partly only.

With these and other objects in view, which will become apparent in the following detailed description, the present invention will be clearly understood in connection with the accompanying drawing, in which:

FIGURE 1 is a perspective front view of the film camera designed in accordance with the present invention;

FIG. 2 is a current diagram of the photo-electric cell for one full period of the shutter movement; and FIG. 3 is a circuit diagram of the film camera.

Referring now to the drawing, and in particular to FIG. 1, the camera objective 1 is disposed in front of the film 2 and a rotating shutter 3 is arranged between the objective 1 and the film 2 and provided with a photo-sensitive layer 4 on the side facing the objective. The frame gate 5 of the camera, shown in dashed-lines, in covered by the shutter 3, while the camera stands still, the position of the shutter 3 being being determined by a stop or abutment member 6, which upon arresting the camera, enters into the path of an extension 8 rotating with the shutter shaft 7. By the cooperation of the stop 6 with the extension 8, the position of the shutter 3 is exactly defined in relation to the objective 1 while the camera stands still. In the zone of the shutter 3 disposed opposite the objective 1 while the camera stands still, the photo-sensitive layer is covered by a semi-transparent coating or by a raster 9 printed on said layer.

The light penetrability $\eta$ of the coating or of the raster can be determined by the following values: if $\alpha$ is the range of the non-printed photo-electric layer, $\beta$ is the range in which the efficiency of the photo-electric cell is reduced, and $\gamma$ is the remaining photo-electrically ineffective part of the shutter 3, which is generally equal to the size of the shutter opening, then the light penetrability $\eta$ results from the following formula:

$$\eta = \frac{\alpha}{\alpha + \gamma}$$

In the present example $\alpha$ has 144°, $\beta=36°$ and $=180°$. Thus the resulting value is:

$$\eta = \frac{4}{9}$$

Referring now again to the drawing and in particular to FIG. 2, the course of the delivered current of the photo-electric cell is shown during one complete cycle of rotation of the shutter.

In order to eliminate as much as possible the influence of the contact resistors on feeding off the photo-cell current from the rotating shutter 3, a transistor amplifier 13 is disposed in the hub 10 of the shutter 3, the current of which is fed off, on the one hand, by means of a sliding ring 11 insulatingly mounted on the hub 10 and by means of a brush 12 and, on the other hand, by means of grounding.

Referring now again to the drawing, and in particular to FIG. 3, the circuit diagram of the new device is shown. The circuit comprises a battery-source 15, one terminal of which is connected with ground and thus is connected in series with the grounded terminal of the amplifier 13, which in turn is connected with the sliding ring 11 and, thereby with the brush 12. The latter is in series connection with the measuring instrument 14. The circuit can be closed by a switch 16, which may be coupled to the camera release (not shown). The resistors 17 and 18 disposed likewise in series in the circuit, serve the purpose to respond to the picture frequency and the film sensitivity, respectively. If the camera should be provided with an adjustable shutter, it is suitable to provide the rheostat in the hub of the shutter for adjustment to the shutter opening.

If the new device is used as a semi-automatically operating exposure control device, the objective diaphragm must be adjusted until the pointer of the measuring instrument 14 coincides with a stationary scale index (not shown).

If the measuring instrument 14 itself is to adjust the objective diaphragm, it would be suitable to design the measuring instrument as a moving coil system comprising two frame windings, but without a return spring. One winding is fed, thereby, by the current originating from the photo-electric cell, while the second winding is connected with the battery 15 by means of resistors. By this arrangement a constant directing moment is obtained and at the same time the influence of changes in the voltage of the battery 15 is compensated.

The present invention is not restricted to the illustrated example. There are numerous variations possible, without departing from the scope of the invention. This invention can be of use with the same advantages for cameras comprising swinging shutters.

While I have disclosed one embodiment of the present invention, it is to be understood that this embodiment is given by example only and not in a limiting sense, the scope of the present invention being determined by the objects and the claims.

I claim:

1. A film camera including an exposure metering device, comprising an objective, a frame, said frame defining a gate opposite said objective, a periodically moved shutter in order to cover periodically said frame gate, means for locking said shutter in a predetermined position covering said gate in the inoperative position of said camera, a photo-sensitive layer disposed on said shutter opposite said objective, a measuring instrument in electric circuit connection with said photo-sensitive layer to control said measuring instrument, means for reducing the efficiency of the part of said photo-sensitive layer with respect to the efficiency of the remaining parts of said photo-sensitive layer within a range thereof in which a picture is projected thereon through said objective in the inoperative position of said camera, said reduced efficiency being equal to the average value of said efficiency over a full period of the movement of said shutter, and said efficiency being defined as a proportion of delivered electric energy to the light energy incident through said objective.

2. The film camera, as set forth in claim 1, wherein said shutter is rotatably mounted and includes a hub, a sliding ring insulatingly mounted on said hub and a brush engaging said sliding ring, and said sliding ring and said brush being interposed in the circuit connecting said photo-sensitive layer with said measuring instrument.

3. The film camera, as set forth in claim 2, which includes a micro-amplifier mounted on said rotatable shutter, said micro-amplifier being in circuit connection with and controlled by said photo-sensitive layer, and in circuit connection with said measuring instrument over said sliding ring and said brush.

4. The film camera, as set forth in claim 1, wherein said means for reducing the efficiency of said photo-sensitive layer comprises a semi-transparent layer disposed in front of said photo-sensitive layer.

5. The film camera, as set forth in claim 4, wherein said semi-tranparent layer is a raster of light-tight and transparent surface elements.

References Cited in the file of this patent
UNITED STATES PATENTS 2,058,532    Tuttle _____ Oct. 27, 1936